United States Patent
Archibald et al.

(10) Patent No.: US 11,167,718 B2
(45) Date of Patent: Nov. 9, 2021

(54) SAFE JOURNEY SEAT MOUNT

(71) Applicants: Kami J. Archibald, Trenton, OH (US); Brittany M. Swadener, Hamilton, OH (US); Aaron H. Harris, Clayton, NC (US)

(72) Inventors: Kami J. Archibald, Trenton, OH (US); Brittany M. Swadener, Hamilton, OH (US); Aaron H. Harris, Clayton, NC (US)

(73) Assignee: BESI, Inc., Hamilton, OH (US)

( * ) Notice: Subject to any disclaimer, the term of this patent is extended or adjusted under 35 U.S.C. 154(b) by 135 days.

(21) Appl. No.: 16/288,291

(22) Filed: Feb. 28, 2019

(65) Prior Publication Data

US 2019/0270426 A1    Sep. 5, 2019

Related U.S. Application Data

(60) Provisional application No. 62/638,483, filed on Mar. 5, 2018.

(51) Int. Cl.
*B60R 22/10* (2006.01)
*B60R 22/12* (2006.01)
*B60N 2/28* (2006.01)

(52) U.S. Cl.
CPC .......... *B60R 22/105* (2013.01); *B60N 2/2809* (2013.01); *B60R 22/12* (2013.01)

(58) Field of Classification Search
CPC ..... B60R 22/105; B60R 22/14; A47D 15/006; B60N 2/2812
USPC .................................. 297/465, 468, 256.17
See application file for complete search history.

(56) References Cited

U.S. PATENT DOCUMENTS

| | | | |
|---|---|---|---|
| 1,288,170 A | 12/1918 | Pick | |
| 1,816,262 A | 7/1931 | Ritter | |
| 2,677,488 A | 5/1954 | Prusan | |
| 2,833,344 A | 5/1958 | Lucht | |

(Continued)

OTHER PUBLICATIONS

Stewart, Deborah and Donaldson, Denise, The School Bus Safety Handbook, Jun. 2013, p. 32, Second Edition 2013, Safe Ride News Publications, Edmonds, WA, USA.

(Continued)

*Primary Examiner* — Sarah B McPartlin

(57) ABSTRACT

A seat mount, to be used with a school bus restraint vest or harness that provides a means where the passenger seated in the restraint cannot easily remove himself or herself from the seat mount without the assistance of another individual. The upper attachment of the seat mount loops-through D-rings on the passenger's vest, and then returns and attaches to the backside of the seat, out of reach of the passenger. The straps of the upper attachment may also be independently adjusted after the seat mount is attached to the passenger wearing the vest. The lower attachment at the hips includes a deterrent in which the passenger cannot easily remove the snap hook from the D-ring. This is accomplished by using a metal O-ring that is slipped over the snap hook tongue preventing it from opening. These improvements to the upper and lower attachments of the seat mount inhibit a student from getting up from a school bus seat when the child is not permitted to do so, thus providing protection for the student, driver and other passengers on the school bus.

1 Claim, 4 Drawing Sheets

(56) References Cited

U.S. PATENT DOCUMENTS

Figure 1:
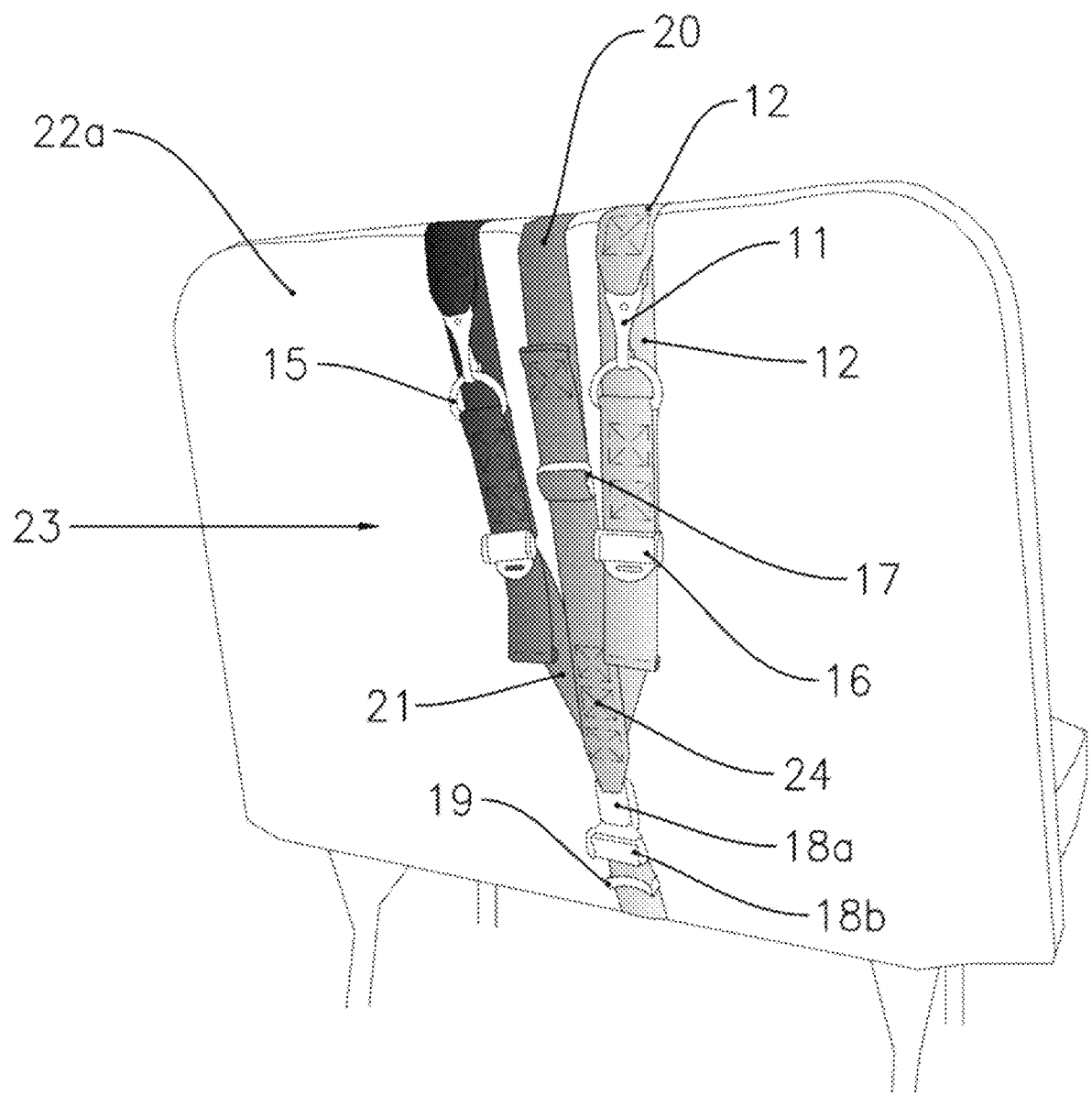

| | | | |
|---|---|---|---|
| 2,856,991 A | | 10/1958 | Princiotta |
| 2,879,078 A | | 3/1959 | Dewees |
| 3,028,200 A | | 4/1962 | Dye |
| 3,099,486 A | | 7/1963 | Scott |
| 3,321,247 A | | 5/1967 | Dillender |
| 3,834,758 A | * | 9/1974 | Soule ............ B60R 22/105 |
| | | | 297/484 |
| 4,226,474 A | | 10/1980 | Rupert et al. |
| 4,709,966 A | | 12/1987 | Parkinson et al. |
| 5,443,037 A | | 8/1995 | Saleme |
| 5,664,844 A | * | 9/1997 | Greene ............ A47D 15/006 |
| | | | 297/485 |
| 5,733,014 A | | 3/1998 | Murray |
| 6,402,251 B1 | | 6/2002 | Stoll |
| 6,547,334 B1 | | 4/2003 | Girardin |
| 10,661,749 B2 | * | 5/2020 | Kim ............ B60R 22/20 |

OTHER PUBLICATIONS

School Transportation News Magazine, 2014, pp. 126-127, Buyer's Guide, STN Media Group, Torrance, CA, USA.
BESI, Inc. Product Catalog, Mar. 2016, pp. 8-9, 16-17, Hamilton, OH, USA.

* cited by examiner

SAFE JOURNEY SEAT MOUNT

CROSS-REFERENCE TO RELATED APPLICATIONS

This application claims the benefit of provisional patent application Ser. No. 62/638,483 filed 2018 Mar. 5 by the present inventors.

FEDERALLY SPONSORED RESEARCH

None.

SEQUENCE LISTING

None.

CLASSIFICATION

B60R22/10, B60R22/14, B60R22/105

REFERENCES CITED

U.S. Patent Documents

| | | | |
|---|---|---|---|
| 1,288,170 | December 1918 | Pick | B60R22/105, A47D15/006 |
| 1,816,262 A | November 1929 | Ritter | A47D15/008, A47D15/006 |
| 2,677,488 A | May 1954 | Prusan | A47D15/006, |
| 2,833,344 | May 1958 | Lucht | B60R22/105 |
| 2,856,991 | October 1958 | Princiotta | B60R22/105, B60R22/02 |
| 2,879,078 | March 1959 | Dewees | B60R22/02 |
| 3,028,200 | April 1962 | Dye | B60R22/105 |
| 3,099,486 | July 1963 | Scott | A47D15/006, B60R22/105 |
| 3,321,247 A | May 1967 | Dillender | A47D15/006, B60R22/105 |
| 4,226,474 | October 1980 | Rupert et al. | A47D15/006, B60R22/105 |
| 4,709,966 | December 1987 | Parkinson et al. | B60R22/105 |
| 5,443,037 | August 1995 | Saleme | A01K27/002, A01K1/0272, Y10S119/907 |
| 5,733,014 | March 1998 | Murray | B60R22/14 |
| 6,547,334 B1 | November 2001 | Girardin | B60R22/105 |
| 6,402,251 B1 | June 2002 | Stoll | B64D25/06, B60N2/265, B60N2/2812, B60N2/2839, B60R22/105, B64D11/0612, B60R22/14 |

BACKGROUND

Typical school bus seats are designed to contain passengers safely without the need for seat belts. These seats are developed with special layers of foam on the seat backs and compact seat spacing to protect children in the event of a bus crash. This system is called "compartmentalization", but it is colloquially referred to as the "egg crate" principle, whereas passengers can be protected and cushioned in a crash without the need for restraints.

More modern buses sometimes contain lap belts or lap-shoulder belts, but they are expensive for schools to purchase. There are even fewer buses that contain four or five-point harness systems to contain passengers. Those buses are even more expensive and are usually for a specific use rather than general transportation.

While more modern bus seats are sometimes equipped with restraints, they lack the ability to fully detain an individual from rising out of a seat on a bus that is in motion or to provide adequate protection in the event of a crash.

There are students that have mental disabilities or physical disabilities that require an extra degree of protection for a safe school bus ride. This can be true for both the student, the driver, and other passengers on the bus.

For instance, a student with mental disabilities could be placed in a bus seat without any restraints, yet would likely continue to get up from the seat when it is in motion, no matter how many times the student is told to sit down. Likewise, a lap belt or lap-shoulder belt would do little to restrain an individual that really has no desire to sit on a seat and be still. He or she would simply undo their belt by pushing the buckle release button and remove it from himself or herself. There are also students with physical disabilities, such as low muscle tone, in which a lap shoulder belt is inadequate to hold the child upright and could result in the child slumping over in unsafe positions for the bus ride.

The need for more adequate restraints for passengers was realized several years ago in U.S. Pat. No. 5,733,014 to Murray (1998). The solution was an add-on restraint that could be used on a typical school bus bench seat, but would provide necessary protection for non-typical children. The resultant device involved a restraint system for securing a passenger to a bus seat with a combination of a vest the student would wear that could be attached to the bus seat using a seat mount that would fasten to both the bus seat and the vest. The vest consisted of a pair of lateral torso straps and a set of vertical shoulder straps sewn together. This then was secured around the child with an adjustable zipper closure at the back of the vest. The seat mount was comprised of seat belt webbing that would loop around the bus seat back and attach behind the seat back using a standard seat belt buckle. Attached to the webbing loop were four (4) snap hooks that clipped into the child's vest when they were seated in the bus seat. This system effectively created a four-point harness for the child, or a five-point harness when the vest was equipped with a crotch strap. Devices like these have been used for many years on buses for non-typical children to address a variety of needs with regards to protection of the child, driver, and other bus passengers.

The previously mentioned restraint harness is effective insofar as keeping the student in the seat as long as he or she is not able to undo the restraint. There are many clever children who do not understand that the restraint is for their safety, and will do anything they can to escape from it. This includes simply unclipping the vest from the seat mount so they are able to get up from the seat. This can be potentially hazardous for not only the student but others on the bus including the driver. It is necessary that all remain seated on the bus for the safety of everyone involved. Several years ago, this particular need was addressed by E-Z-On Products LLC of Jupiter, Fla. with their Max Vest. Dubbed a "Houdini Vest", it was designed so that the student would be unable to escape from the restraint without the aid of another individual (typically the school bus driver or a responsible aide). The Max Vest was different from other restraint vests such that some of the seat mount attachments were actually sewn into the vest itself rather than self-contained separately on the seat mount. Typical restraint vests allow for the parent(s) to pre-dress the student in the restraint vest prior to the school bus arrival. The driver then only has to clip the student to a pre-installed bus seat mount once the student boards the bus. However, the differences in the Max Vest required multiple challenging steps to install which made it difficult for bus drivers to use in a timely manner to secure students and continue with their bus route. The Max Vest is also quite involved with many components making it very expensive for school systems to purchase for their students rather than a regular restraint harness.

In addition, there is not currently a seat mount design that allows the seat mount attachments to be adjusted further once the child is seated and clipped into the restraint system. Current adjustability requires the driver to fine-tune the seat mount to the proper shoulder strap length and hip strap length via a slide adjuster on the central strap of the seat mount, or by taking up additional webbing slack on the belt buckle of the central strap. To make corrections for the child's height, the child would have to get up from the seat while the driver or responsible aide increased or decreased the webbing length using the slide adjuster. This can be a burdensome experience if the child has to get up and sit down multiple times in order to get the proper fit.

In conclusion, insofar as we are aware, there is no prior system for securing a student to a bus seat using a restraint harness that will prevent the student's ability to remove himself or herself from it without a high level of time and difficulty on the part of the installer, namely a bus driver or driver's aide. There is also not a currently existing restraint system that is tamper-proof or tamper-resistant (on the part of the student) that does not require the student to wear most of the bus seat attachment straps on the restraint vest itself. Additionally, there is no current seat mount system that allows adjustability for fitment after the student is secured into the seat.

SUMMARY

An improved bus seat restraint system modifies only the seat mount of the restraint system and therefore can still be used with a standard restraint vest. As such, the clip-in points on the seat mount have been improved to include a loop-through feature at the shoulder attachments, independent adjustments at each shoulder strap, and a deterrent device at the lower hip clip-in location. For the shoulder feature, instead of the seat mount straps clipping directly to the D-ring on the vest to where the student has access to remove them, they are now looped through the D-ring on the front of the vest using additional webbing and then clipped into another D-ring on the seat mount behind the seat where it is out of reach of the child. Additionally, the improved seat mount features independent adjustments of the shoulder strap lengths behind the seat. All other seat mount varieties up until now have always had one straight length of webbing to attach to at the shoulder. This new feature allows each shoulder strap to be adjusted after the child is clipped into the securement in order to achieve the best fit.

At the lower hip attachment, the same snap hooks are used but with an additional component that acts as a deterrent to unclip the snap hook. A metal O-ring is used to slip over the tongue of the snap hook rendering the snap hook unable to open. Only a user with two available hands would be able get the O-ring off the snap hook in order to open it again. If the child is properly secured in the seat, he or she should not be able to reach with two hands to one side of their body in order to operate the snap hook open. Therefore, these upgrades to the seat mount only provide enough restriction to the student to keep them seated for the duration of the bus ride, while making the placement of the student into and out of the device relatively easy for the driver or driver's aide. Also, due to the few components necessary to provide the improvements to this device, it can be achieved at a much lower cost than other products promoting "Houdini-proof" features.

DRAWINGS

FIG. 1 is a perspective view from the backside of a bus seat 22 in which the new seat mount 23 is installed. The mount is comprised of seat belt webbing conforming to requirements of FMVSS 209 and several other metal and plastic components. The center webbing 20 is black webbing that is connected on each end by a standard FMVSS 209 seat belt buckle 18, in which one end contains the male end 18b and the other the female end 18a. The male end 18b is adjustable and also contains a keeper 19 for containing any webbing extending out after it is looped over the male adjuster 18b. The black webbing on the female end of the seat belt buckle 18a is looped through the opposite end and tacked with a series of automotive box X tacks 24. The box X tacks 24 also sandwich additional webbing in a "V" formation 21 that could be one of four (4) different colors (beige, burgundy, grey, or navy). The colors of the webbing indicate the size of the mount and which size vest should be paired with it. The colored webbing is folded into a "V" shape 21 and is placed in between the lower and upper pieces of black webbing 20 as it is fed through the female end of the seat belt buckle 18a. The entire assembly is then tacked with three (3) box X automotive tacks 24. At the opposite end of the female seat belt buckle 18a, there is a plastic slide adjuster 17 that is used to situate the mount in the proper position on the seat depending on the height of the individual that will be using it and the size of the bus seat in which it will be used. The free ends of the "V" 21 are inserted and looped over a roller adjuster 16 on each side. The ends of the webbing are folded over and stitched to prevent pull thru. Opposite the roller adjuster 16, there is a metal D-ring 15 that is secured to the colored webbing 12 with two (2) box X automotive tacks. The D-ring 15 is where the snap hook 11 will clip on.

Figure 2:
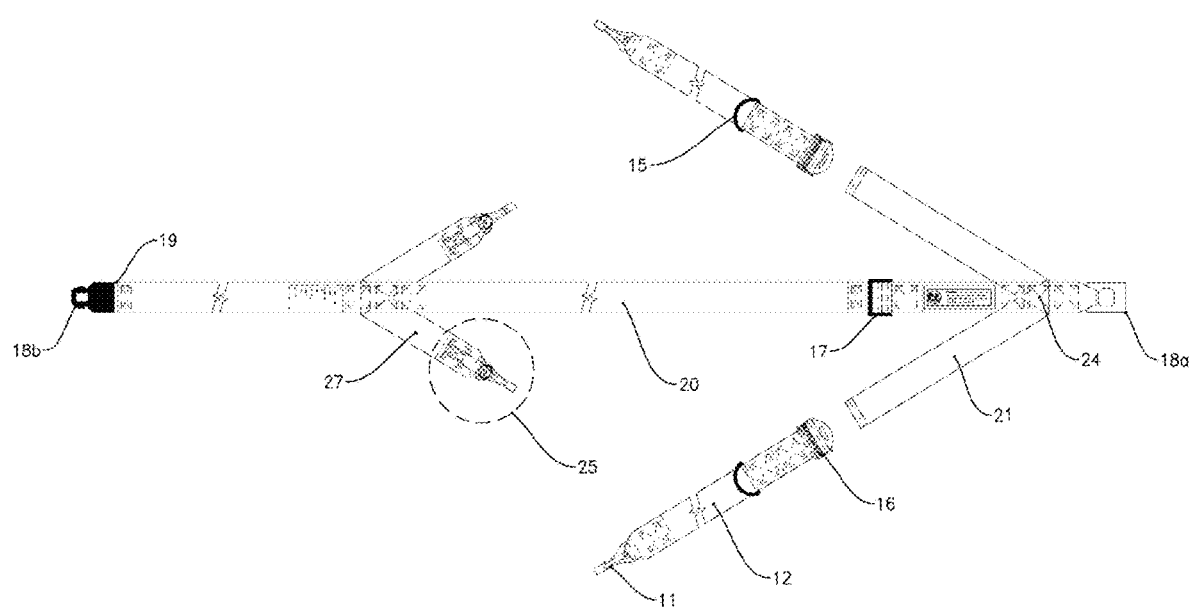

FIG. 2 is a plan view of the seat mount 23 prior to installing on the bus seat 22. In addition to the shoulder attachment 21 and 12, there is another "V-style" yoke 27 at the base of the mount 23 that is concealed in the bus seat bight 33 when it is installed. This yoke 27 is used to clip in the lower portion of the vest 14 to secure the passenger's hips to the seat 22. The lower yoke 27 consists of seat belt webbing in a variety of colors and lengths depending on the size of the seat mount 23 needed. This is tacked in place to the black webbing 20 with a series of box X automotive tacks. At the end of each colored strap, is a snap hook assembly 25.

Figure 3:
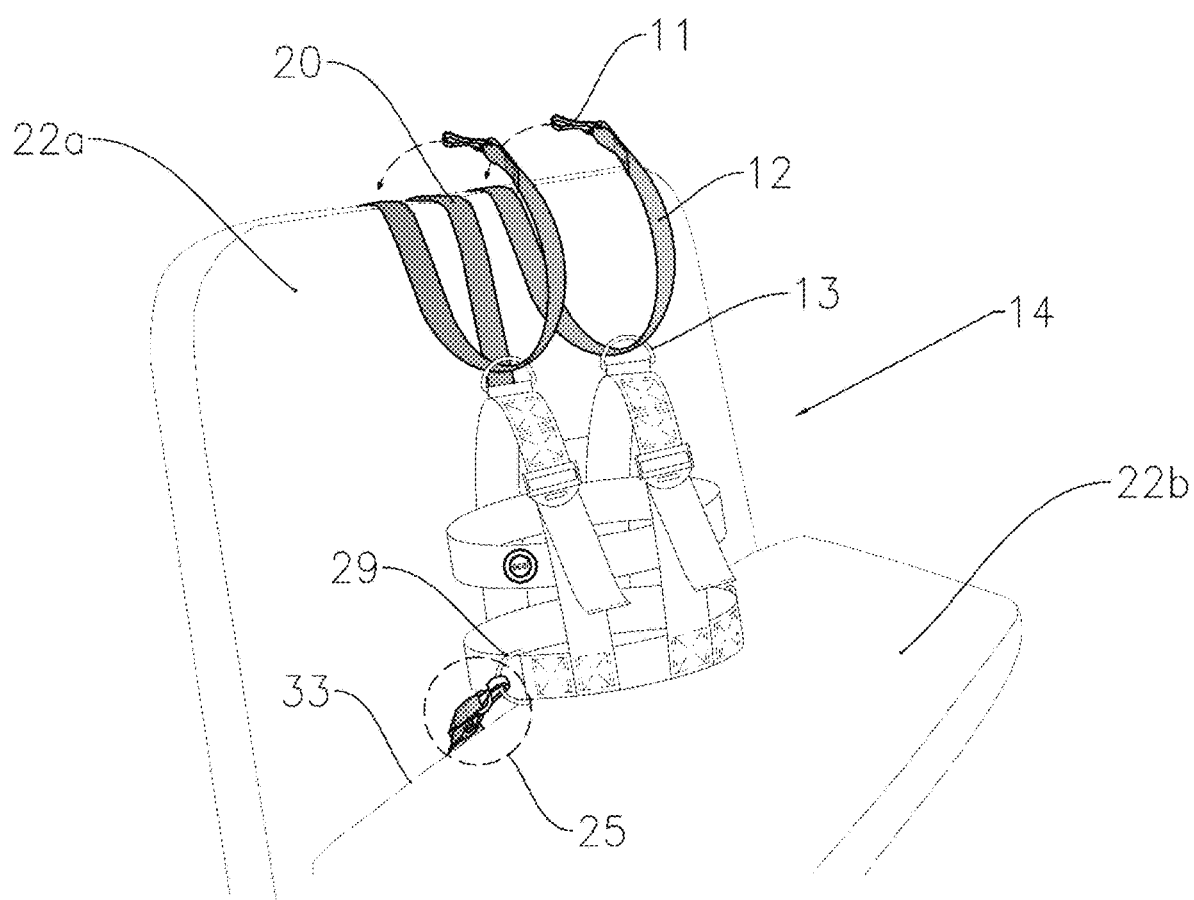

FIG. 3 is a perspective view taken from the user's right side of the vest 14. As stated in the summary, only the seat mount has been updated for this system. The vest or harness that is used in the restraint system is a standard vest that is readily produced by BESI, Inc., and can currently be purchased in a variety of sizes. The FIG. 3 view shows how the seat mount assembly 23 secures the vest 14 to the seat using shoulder straps 12, snap hooks 11, and lower snap hook assembly 25.

Figure 4:
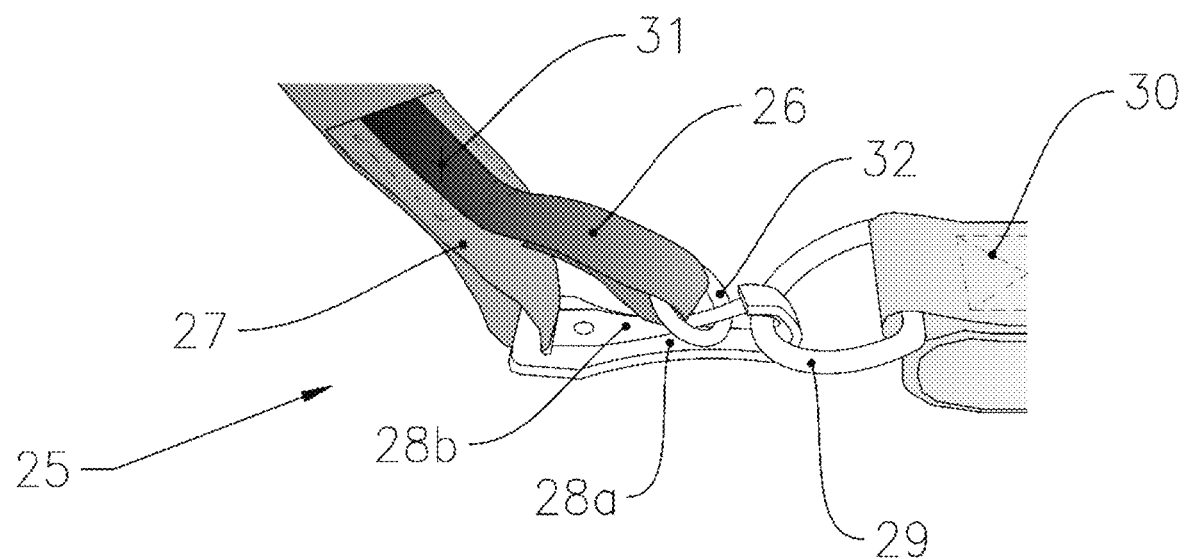

FIG. 4 is a zoomed-in view of the snap hook assembly 25, which consists of a regular snap hook 28a plus a 1-inch piece of webbing 26 that is slipped over a ¾-inch metal O-ring 32 and tacked 31 to the colored webbing 27. The snap hook 28a is attached to the hip D-ring 29 on the vest 14, then the O-ring 32 is slid over the tongue 28b of the snap hook 28a. The webbing 27 is then pulled taught to secure the student using seat belt adjuster 18b. In turn, the O-ring 32 is pulled tight against the crook of the tongue 28b of the snap hook 28a.

REFERENCE NUMERALS

- 11 Shoulder snap hook
- 12 Shoulder loop-through webbing straps
- 13 Shoulder Vest D-ring
- 14 Restraint Vest or Harness assembly
- 15 Seat Mount D-ring
- 16 Seat Mount Roller adjuster
- 17 Seat Mount Slide adjuster
- 18a Seat Belt Buckle, female end
- 18b Seat Belt Buckle, male end
- 19 Seat Mount Webbing keeper
- 20 Seat Mount Black webbing
- 21 Seat Mount upper yoke, colored webbing
- 22a Bench bus seat, seat back
- 22b Bench bus seat, cushion
- 23 Seat Mount assembly
- 24 Seat Mount upper yoke box X tacks
- 25 Lower yoke snap hook assembly (deterrent)
- 26 1-inch black webbing
- 27 Seat mount lower yoke, colored webbing
- 28a Hip snap hook
- 28b Hip snap hook tongue
- 29 Hip Vest D-ring
- 30 Hip vest box X tacks
- 31 Hip Seat Mount box X tack
- 32 ¾-inch Metal O-ring
- 33 Seat bight Operation To attach a student to the new seat mount, the student should already be outfitted with a standard restraint vest or harness that is properly sized based on the student's torso height and waist size. The new seat mount should be selected in a size to match the vest, which is color coordinated. The seat mount is then installed on a typical bus seat as follows:

1) The cushion portion of the bench bus seat 22b is lifted (see FIG. 3), and the male end of the cam wrap buckle 18b is placed into the space between the seat cushion and the seat back (also known as the "seat bight") 33. The seat cushion assembly 22b is then closed and secured. On some seats, lifting the seat cushion 22b is unnecessary; the male end 18b of the seat mount 23 is simply pushed through the seat bight 33, between the cushion 22b and seat back 22a until it is visible from behind and below the seat back 22a.
2) The female end of the seat mount buckle 18a is placed over the top of the seat back 22a and the male end 18b is brought around from the bottom (see FIG. 1). The seat belt buckle 18 is clicked together making sure that release button is facing inward toward the seat back 22a. Buckle 18 should be positioned low, near the middle to bottom of the seat back 22a.
3) The bottom hip snap hooks 28a are extended about 1 to 3 inches out of the seat bight 33 onto the seat cushion 22b. The shoulder straps 12 hang temporarily.
4) The slide adjuster 17 can be used to fit the belt around the seat back 22a if necessary. Also the adjuster on the male belt buckle 18b can be used to correct the fit of the mount on the seat.

The student wearing restraint vest or harness 14 is then attached to the seat mount 23 as follows:

1) With passenger sitting down, the long shoulder straps 12 are fed from the back of the seat 22a, over the seat 22a, then through the upper D-rings 13 of the vest 14, and double-back around to fasten to D-rings 15 on seat mount behind the seat 22a (see FIG. 3). If the straps 12 are loose, they are tightened until snug by using roller adjusters 16 behind the seat. If there is not enough room to tighten the shoulder straps using the roller adjusters 16, the upper yoke 21 of the seat mount 23 is raised or lowered using the slide adjuster 17.
2) Ensuring the passenger is seated snugly against the seat bottom and seat back, then the snap hooks 28a are clipped onto lower D-rings 29 at the hips (see FIG. 3, FIG. 4). D-ring 29 is pulled far back into the curve of the hook 28a to make room for the O-ring 32.
3) The snap hook webbing 27 is cocked at an angle (snap hook is folded against its webbing) and metal O-ring 32 is slipped over snap hook tongue 28b.
4) Once both the D-ring 29 and O-ring 32 are secured in the snap hook 28a, the hip straps 27 are pulled snug down into the seat bight 33. As long as the straps 27 are pulled taught, the passenger will find difficulty in removing the snap hook 28a with the O-ring 32 in place.
5) To remove the lower snap hooks, the above process is reversed.
6) To remove the upper shoulder straps, the roller adjusters 16 are lifted to loosen the webbing 21 until the snap hook 11 can be easily unclipped from the D-ring 15, and the shoulder straps 12 can be removed.

The invention claimed is:
1. A securement seat mount for a transportation vehicle, comprising:
   a. an adjustable central strap configured to encircle a vehicle seat back, and
   b. a plurality of elongated upper webbing straps permanently affixed to said central strap where said webbing straps are configured to extend from behind and over said seat back, through upper D-ring attachments of a restraint harness worn by a passenger and loop back over said seat back to attach to another set of D-rings affixed to said upper webbing straps and configured to be positioned behind said seat back and out of reach of said passenger seated in said restraint harness, and
   c. said upper webbing straps are configured to be adjusted independently and individually while attached to said passenger wearing said restraint harness, and
   d. a lower plurality of webbing straps permanently affixed to said central strap and including attachment hardware assemblies comprising O-rings permanently affixed to ends of said lower webbing straps and slid over an operating portion of a snap hook which is configured to be connected to lower attachments of said restraint harness, limiting removal by said passenger wearing said restraint harness and connected to said securement seat mount, whereby said passenger cannot easily remove himself or herself from said securement seat mount without assistance of another individual.

* * * * *